United States Patent
Deas et al.

(10) Patent No.: US 8,427,194 B2
(45) Date of Patent: Apr. 23, 2013

(54) LOGIC SYSTEM WITH RESISTANCE TO SIDE-CHANNEL ATTACK BY EXHIBITING A CLOSED CLOCK-DATA EYE DIAGRAM

(76) Inventors: Alexander Roger Deas, Dalkeith (GB); David Coyne, Glenrothes (GB)

( * ) Notice: Subject to any disclaimer, the term of this patent is extended or adjusted under 35 U.S.C. 154(b) by 0 days.

(21) Appl. No.: 13/114,399

(22) Filed: May 24, 2011

(65) Prior Publication Data

US 2011/0285420 A1 Nov. 24, 2011

Related U.S. Application Data

(60) Provisional application No. 61/347,521, filed on May 24, 2010.

(51) Int. Cl.
*H03K 19/00* (2006.01)
*H03K 3/00* (2006.01)

(52) U.S. Cl.
USPC .................................. 326/8; 327/291

(58) Field of Classification Search .................. None
See application file for complete search history.

(56) References Cited

U.S. PATENT DOCUMENTS

| | | | |
|---|---|---|---|
| 6,327,661 B1 | 12/2001 | Kocher et al. | |
| 6,507,130 B1 | 1/2003 | Thuringer et al. | |
| 6,766,455 B1 | 7/2004 | Ryan, Jr. | |
| 7,417,468 B2 | 8/2008 | Verbauwhede et al. | |
| 7,639,058 B2 * | 12/2009 | Kurokawa et al. | 327/291 |
| 2007/0273408 A1 * | 11/2007 | Golic | 326/93 |
| 2009/0267640 A1 * | 10/2009 | Kuzmenka | 326/30 |

OTHER PUBLICATIONS

IEEE Proceedings, ISCAS 2005, Low Power Current Mode Logic for Improved DPA-Resistance in Embedded Systems, Toprak and Leblebici.
IEEE Proceedings, ISCAS 2005, A Novel CMOS Logic Style with Data Independent Power Consumption, Aigner et al.

\* cited by examiner

*Primary Examiner* — Crystal L Hammond

(57) ABSTRACT

An improvement in the security of a logic system by minimizing observable features such as the power supply or electromagnetic radiation, so called, "side-channel attacks". Specifically, the present invention comprises a technique and methods for reducing the ability of an intruder to monitor the relationship between currents in the system and the data in the system through the use of a randomized clock wherein the clock eye diagram is closed and without significant reduction in maximum operating speed compared to the reduction in maximum operating frequency that occurs when using conventional means of additive jitter. A system where the clock eye diagram is completely closed is provably more secure than systems where the clock eye diagram is partially open.

12 Claims, 10 Drawing Sheets

LOGIC SYSTEM WITH RESISTANCE TO SIDE-CHANNEL ATTACK BY EXHIBITING A CLOSED CLOCK-DATA EYE DIAGRAM

BACKGROUND OF THE INVENTION

1. Technical Field

The present invention relates to providing security to a logic system from attack through monitoring of observable features such as the power supply or electromagnetic radiation, in so called "side-channel attacks". A side-channel attack may seek to obtain information concerning the contents of the system, such as a private key or crypto-engine data.

Any system that has a partially open clock data eye is susceptible to side-channel attack. It is not sufficient to close the eye partially: it must be fully closed to be secure. It is also not sufficient to add noise to a clock or data emitter to disguise the signal: statistical analysis of a noisy eye can determine very quickly what the data is with the noise removed. For a system to be secure from side channel attack, the emissions must be completely random, and this requires a closed clock eye diagram. Attempts described in the prior art other than a co-pending application by the same inventors all leave an open, or partially open, clock eye diagram.

Reports that a synchronous system with a partially open clock eye diagram is resistant to attack are due to limits in the abilities of the attacker rather than a formal basis for reliance on the system as being secure. For a provably secure system, the observable clock data eye must be closed.

2. Background of the Invention

Most logic circuits are implemented in standard CMOS where the techniques for design of such logic circuits are well known. It is typical that in the design of standard CMOS logic circuit elements current is drawn from the positive supply when the output of the logic circuit element changes from a logic-0 state to a logic-1 state. As an example a typical CMOS inverter may consist of a PFET and a NFET, the source of the PFET connected to the positive supply, the drain of the PFET connected to the output, the gate of the PFET connected to the input, the source of the NFET connected to the negative supply, the drain of the NFET connected to the output and the gate of the NFET connected to the input. The PFET and NFET are generally implemented as enhancement mode devices. Typically the load on the output of a CMOS inverter is a capacitor comprising parasitic capacitance due to the routing of the output signal to other logic gates and input capacitance of other logic gates. A logic-0 state applied to the input of the CMOS inverter will turn on the PFET, turn off the NFET and charge any capacitance on the output raising the output voltage to a logic-1 state. A logic-1 state applied to the input of the CMOS inverter will turn off the PFET and turn on the NFET forcing the output voltage to the negative supply generating a logic-0 state. Current flows from the positive supply into the output load of the CMOS inverter when the input changes from a logic-1 state to a logic-0 state. Current flows from the load of the CMOS inverter when the input changes from a logic-0 state to a logic-1 state. Current may also flow from the positive supply to the negative supply when the CMOS inverter changes state due to a period when both the PFET and NFET may be both turned on. In a highly synchronous system where many logic elements change state under direction of a clock current peaks may be detectable in the system supply current. It is these current peaks that may enable an observer to determine aspects of the system design that the system designer would rather remain private for reasons of security.

A typical example of where covert monitoring of the power supply current may reveal information to a third party is in smartcard security. Smartcards employ encryption techniques to ensure that neither a PIN number or an encryption private key is revealed to a third party. The key in the encryption scheme has been shown to be readable by monitoring smartcard power supply current. Techniques known as simple power analysis, differential power analysis and higher order differential power analysis have been used to reveal the private encryption key, thereby rendering the security worthless.

It is not always necessary to use such an intrusive technique such as breaking the power supply connections of a smartcard and monitoring the electrical current flow. Electromagnetic emissions occur as a result of current flow and may also be monitored to reveal the temporal position of current peaks, using very near field probes or Kelvin Probes on atomic force microscopes.

It has been explained that in standard CMOS logic gates as employed in an integrated circuit current peaks occur in the positive supply current when the output signal of a logic gate transitions from a logic-0 state to a logic-1 state. One attempt [U.S. Pat. No. 6,327,661] uses random noise generation and clock skipping to randomise the position of current peaks. Any form of introduction of random noise or changes in the clock rate will reduce the maximum data rate that can flow through the encryption engine. Such techniques also results in an increase of current consumption.

Another attempt [U.S. Pat. No. 6,507,130] to improve security relies on switching off the external supply during security-conscious operations and connecting to an internal capacitor which had previously been charged from the external supply. This method suffers from the requirement to have an on-card capacitor which may present a problem in terms of the card form-factor. The other problem with this approach is that it makes it possible to monitor the emissions from the capacitor using near field probes, which are nicely identified for the attacker simply by the switch in power.

Another attempt [U.S. Pat. No. 6,766,455] uses a zener diode and bipolar transistor as a rudimentary linear supply voltage regulator to isolate the internal supply and thereby current peaks from exiting the system. This method suffers from increased power consumption as well as not being suitable for the highest level of integration by using components that are non-standard in VLSI standard CMOS processes. There are other disadvantages and weaknesses created by this method.

Another attempt to make it more difficult to determine the internal workings of an integrated circuit is to use differential logic gates [IEEE Proceedings, ISCAS 2005, Low Power Current Mode Logic for Improved DPA-Resistance In Embedded Systems, Toprak and Leblebicic]. In differential logic gate there exists a true output and a complementary output, one of said outputs always generating a current spike in the positive supply when an output transition occurs.

Another attempt [U.S. Pat. No. 7,417,468] of reducing the current spikes is to employ specialised logic gates that have differential outputs, the differential outputs being reset to logic-0 and then pre-charged to a logic-1 prior to evaluation of the final logic output level. Again, current peaks occur at every logic transition.

Another attempt to de-correlate current peaks and logic state transitions [IEEE Proceedings, ISCAS 2005, A Novel CMOS Logic Style with Data Independent Power Consumption, Aigner et all relies on using ternary logic levels.

The above methods have been shown to have some effect in improving the security of the integrated circuit in resisting attempts to obtain knowledge of the integrated circuit operation or contents. However, all of these methods rely on one or more of the following; balancing edge speed of the inputs, generating equal delays for the true output and complementary output rising edges, and balancing the load capacitance which also includes balancing the routing capacitance. Any imbalance reduces the effectiveness of the differential gate in generating constant amplitude current spikes thereby allowing an intruder to simply increase the complexity of the averaging algorithm to obtain the knowledge sought. These differential systems can be compromised simply by reducing the supply voltage to the point where the differential pair saturates.

Varying the supply voltage, varying the clock frequency or varying both the supply voltage and clock frequency have been shown an increase in resistance to intruder attacks [DATE 2005, Power Attack Resistant Cryptosystem Design, A Dynamic Voltage and Frequency Switching Approach, Yang et al]. The improvement comes from the voltage variation, due the way it is implemented. The method takes a lot of power as it is a linear power supply, and it has a high bandwidth. Near field probing of the supply can detect the feedback to the supply, providing the current information. The technique relies on the use of a linear power supply that may be modulated rapidly in time which may require custom designed cells not available in many standard CMOS processes. Yet further, the use of linear power supplies implies increased current consumption.

Methods that try to prevent power analysis by random frequency variations of a single clock can be comprised both by statistical analysis of the operation of the system on known plain text, or just by synchronizing the power monitor to the clock edge.

A common issue with all of the above methods is that there may be one or more penalties associated with the implementation namely power consumption, circuit processing speed or area increase. There is a need for a method to increase the resistance of an integrated circuit to intruder attacks with minimal penalty of speed, area or power consumption.

It is noted that in order for an intruder to successfully attack an integrated circuit the intruder is required to align multiple power consumption or current consumption traces and perform statistical analysis on the data. Randomising the position of current peaks reduces the ability of the intruder to align successive power consumption or current consumption traces.

Changing the clock frequency can move the position of current peaks associated with logic state changes temporally. However, to modulate the clock frequency it is necessary to operate the system at a lower overall frequency than is possible with modulation, and the reduction in frequency is not generally beneficial. Further, in order to modulate the temporal position of current peaks over a wide time it is necessary to lower the clock frequency significantly which has ramifications on the overall performance of a system. Consider a synchronous logic system comprising of D-type flip-flops (DFF's) where a signal path exists between two DFF's passing through a block of combinatorial logic. The highest frequency that the system can be clocked is dependent to a large extent on the maximum propagation delay through the combinatorial logic. In a state-of-the art system where it is desired to operate the logic system at the highest possible clock speed, the clock period is chosen so that it is slightly larger than the worst-case propagation delay through the combinatorial logic. Any attempt to modulate the clock to move the current peaks associated with state transitions within the logic system will require that the average clock speed is reduced. It is desirable that the system clock operates at the highest frequency for highest performance. It is also desirable that current peaks are moved well away from their nominal temporal position in order to make side channel attacks more difficult. These two desires are at odds with one another. In general, it is desirable to be able to modulate the system clock with minimal impact to the speed of the logic system but solutions known in the prior art that use spread spectrum clocking do not achieve that.

In a synchronous system such as shown in FIG. 1, applying large amounts of clock modulation lowers the operating speed. Consider a synchronous logic system as in FIG. 1 where the maximum delay between any two states of the system is, for example, 20 ns—assume that this figure includes not just the combinatorial path delay but the delays inherent to correct DFF operation. With such a worst-case delay it is possible to operate the synchronous system at clock speeds up to 50 MHz. There exists no possibility of applying random modulation to the system clock as a random function is two-sided and would result in the clock period being less than the minimum allowed. This situation is shown in FIG. 2 where it can be seen that the eye diagram is 100% open and there is no possibility of modulating the clock without a reduction in operating frequency. To effect eye closure of, for example, 80% as shown in FIG. 3 the clock is modulated±40% then the clock period must be increased so that the remaining eye opening represents the worst-case propagation delay. In this example the clock period must be increased to 100 ns i.e. a reduction in operating frequency from 50 MHz to 10 MHz which is a significant penalty in operational speed and eye closure is not achieved. In the example of FIG. 3 the current peaks associated with state changes in synchronous logic are moved over a large portion of the clock period and security is improved but only at the expense of a large reduction in clock frequency. It is beneficial to avoid large reductions in clock speed when modulating the clock to randomise the temporal position of current peaks in a synchronous logic system.

Any systems with either internal clocks, or an external clock supplemented by an internal clock for the encryption engine can be compromised using a very near field probe. This form of attack is simplified by the packaging of smartcards, which generally used linished die, i.e. very thin due, and the rear surface is accessible after removing a local part of the package.

In many systems the clock may be modulated using an integrated circuit that is imposed between the original fixed-frequency clock and the synchronous logic block. Random modulation introduced in a spread-spectrum clock generator integrated circuit is typically only a few percent of the clock periods, for example the CY25811 spread-spectrum clock generator integrated circuit from Cypress Semiconductors Corporation allows double-sided modulation up to ±2% of the clock period. It is clear that as the amount of modulation is small then so too is the amount of movement of the current peaks. The amount of modulation in spread-spectrum clock generator chips is generally kept quite low so the designer of an integrated circuit or system does not have to guard-band the logic timing budget and not impact the maximum operating frequency. The use of such a low amount of modulation has little impact on improving the security since such techniques do not close the clock eye diagram. Accordingly, techniques such as spread spectrum clock generation do not provide much improvement in resistance against side-channel attacks.

Each foregoing prior art counter-attack methods has one or more of the following drawbacks in an integrated circuit or other physical implementation of an encryption engine:

insufficient protection, large physical size, high power consumption, non-standard design flow, library availability to the implementation of a robust and practical encryption engine with high immunity to attack through simple, differential power analysis or higher order differential power analysis.

Any system employing a spread spectrum clock can be comprised easily because the statistical eye diagram for the clock can never be closed. It must be open at least as wide as the maximum propagation path between two registers.

OBJECT OF THE PRESENT INVENTION

It is an objective of the present invention to reduce the sensitivity of logic systems to comprise from monitoring externally observable features, i.e. side channel attacks.

It is a further objective of the present invention to randomise the current peaks associated with state transitions to such an extent that the effective clock eye diagram is closed to form a noise mask It is a further objective of the present invention to provide a synchronous logic system wherein the clock frequency reduction associated with randomising the clock transitions is maintained at a high proportion of the maximum clock frequency.

It is a further objective of the present invention to provide a clocking scheme for a synchronous logic system with improved security.

It is a further objective of the present invention to provide a random clock generator that does not have jitter accumulation.

It is a further objective of the present invention to support design flows that can be implemented using standard CMOS libraries

BRIEF SUMMARY OF THE INVENTION

The present invention relates to a technique and methods that use a random clock signal within a synchronous logic system, randomising the temporal position of current peaks associated with state changes at clock edges. This is achieved by a means of randomising the clock without accumulating jitter such as, a system using a ring oscillator with random modulation of the control voltage, or, a phase locked loop with random modulation of the voltage controlled oscillator, or, a ring oscillator with switching of the number of delay stages. The invention may be applied to any synchronous system, and is of particular importance in logic systems where security of the data or architecture may be compromised by side-channel attacks.

A constant frequency reference clock is input to a delay line that is controlled by a logic controller, the output of the delay line selected in a manner producing an output pulse indicating the start of the next output clock cycle where the minimum separation of edges in the output clock signal is bounded by a lower limit that is set by the maximum propagation delay between stages in the logic, allowing the output clock eye diagram to become closed with only a minimal reduction in clock frequency.

The randomisation of the output clock edges improves the resistance of the logic system to attack methods such as power supply current monitoring, electromagnetic field monitoring or very near field monitoring, as a means to gain an insight to the operation or contents of the system. When the effective clock eye diagram is closed by random jitter, there is provably no data content in the side-channels (current in the power supply, or electromagnetic emissions from the system).

BRIEF DESCRIPTION OF THE DRAWINGS

For a better understanding of the present invention and the advantages thereof and to show how the same may be carried into effect, reference will now be made, by way of example, without loss of generality to the accompanying drawings in which.

DETAILED DESCRIPTION OF THE INVENTION

Figure 1:
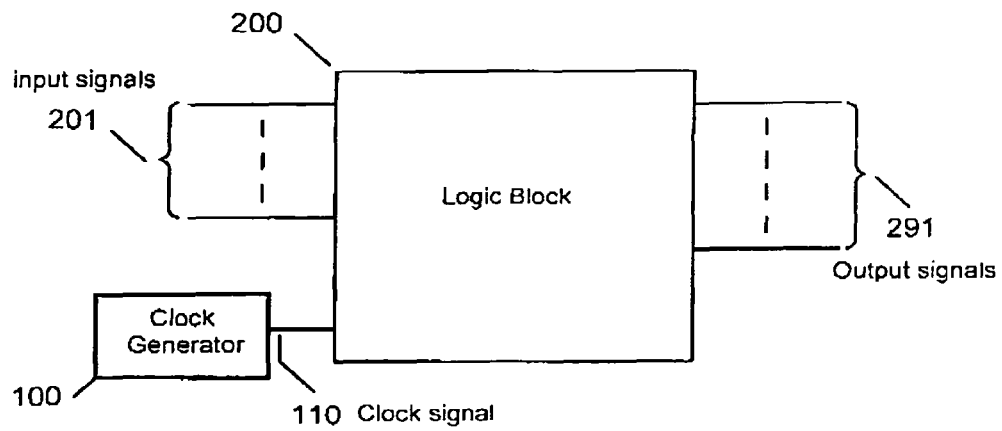
FIG. 1 shows a diagram of part of a synchronous logic system employed in the present invention.
Figure 2:
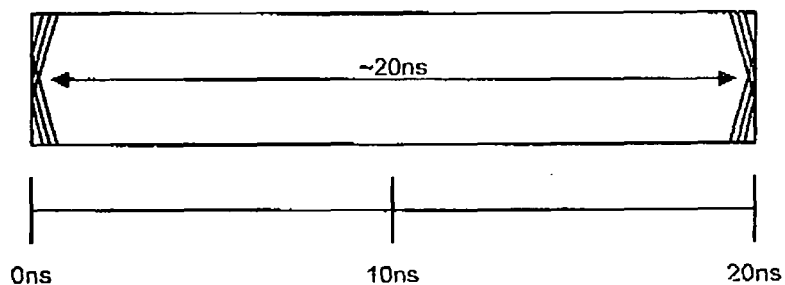
FIG. 2 shows an eye diagram of a prior art synchronous logic system clock modulation running at or very close to the maximum operating frequency.
Figure 3:
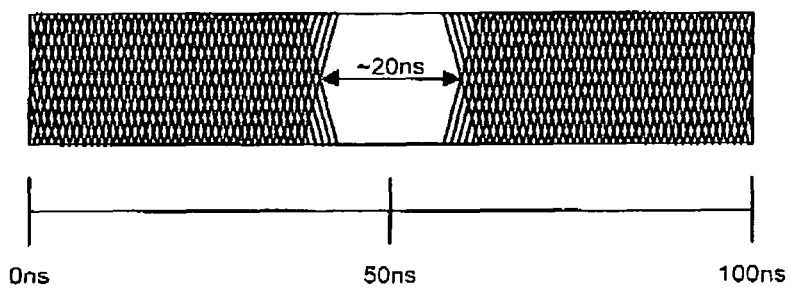
FIG. 3 shows an eye diagram of a prior art synchronous system employing a single clock with a large amount of clock modulation resulting in a lower operating frequency.

FIG. 1 shows a diagram of a synchronous logic system employed in the present invention. Clock generator 100 produces clock signal 110 for synchronous logic block 200 comprising one or more input signals 201 and generating one or more output signals 291. Output signals 291 may change state in response to input signals 201 at transitions of the input clock 110 based on the present and previous state of input signals 201, output signals 291, signals from internally stored states or a combination of one or all of these signals. For clarity of description, the present invention will refer to rising edge clock transitions but it will be clear to any person skilled in the art of logic design that the technique can be applied to logic systems can operate on falling edge clock transitions or both rising and falling clock edge transitions.

Where the synchronous logic systems depicted in FIG. 1 employ standard CMOS logic gates both systems will produce current peaks that may enable decryption of the internal operations that are required to remain secret. As previously shown, modulating the clock will result in a lower operating speed of the system which is not desirable. One measure of the effectiveness of modulating the clock is to observe the eye diagram produced by the clock. An eye diagram that is closed may be considered as being more randomly modulated and is highly resistant to monitoring.

Figure 4:
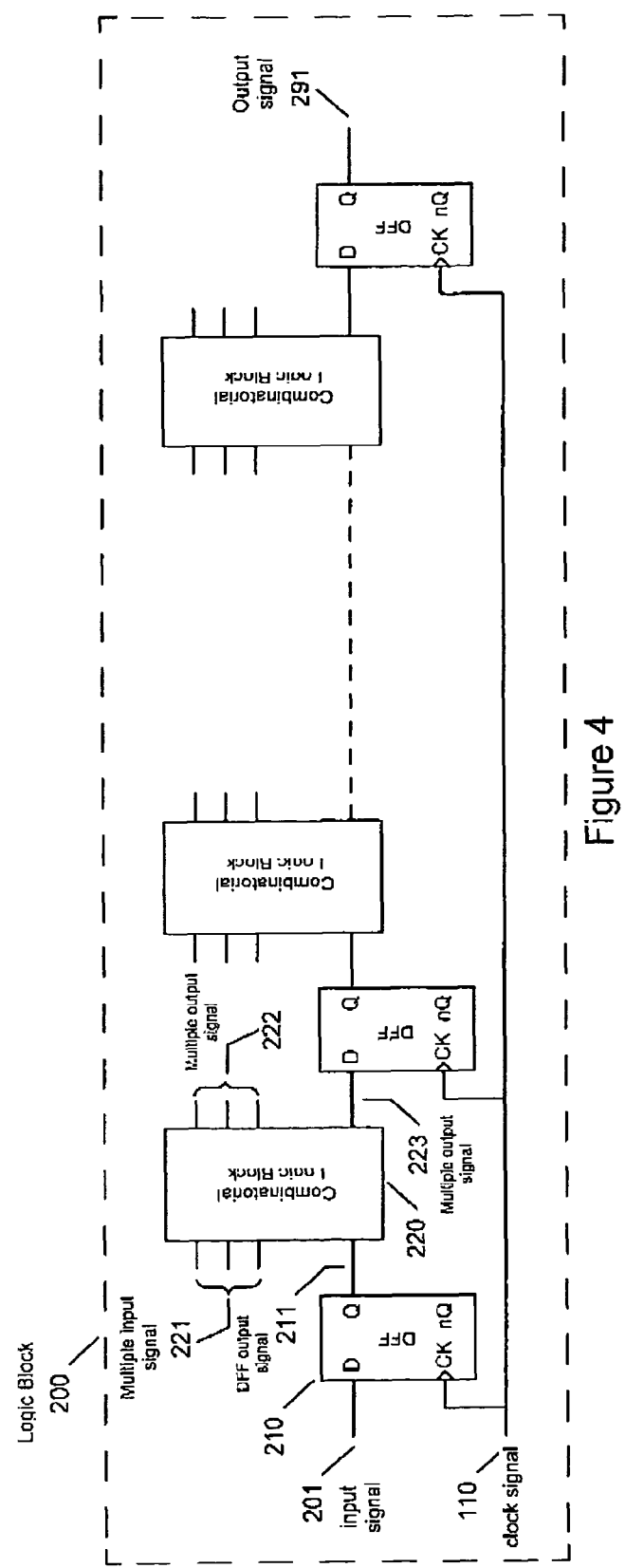
FIG. 4 shows part of a synchronous logic system as disclosed in the present invention with pipelined stages.

FIG. 4 shows part of a typical synchronous logic system 200 where there may be a plurality of input signal's applied to a plurality of state storage elements, in this example depicted as D-type flip-flops (DFF's). Similarly a typical synchronous logic system may have a plurality of output signals. Single input signal 201 applied to DFF 210 producing DFF output signal 211 on the application of a rising edge of clock signals 110. DFF output 211 is passed through combinatorial logic block 220. Combinatorial block 220 has multiple input signals 211 and 221 and multiple output signals 222 and 223. Combinatorial block 220 generates output signals 222 and 223 which may be described by Boolean combinations of the input signals 211 and 221. Output signal 223 of combinatorial logic block 220 is presented as an input to DFF 230 where the logic state of said signal is stored on the application of a rising edge clock signal 110. This process continues through a plurality of DFF's and combinatorial blocks to produce a final output signals including output signal 291.

Figure 5:
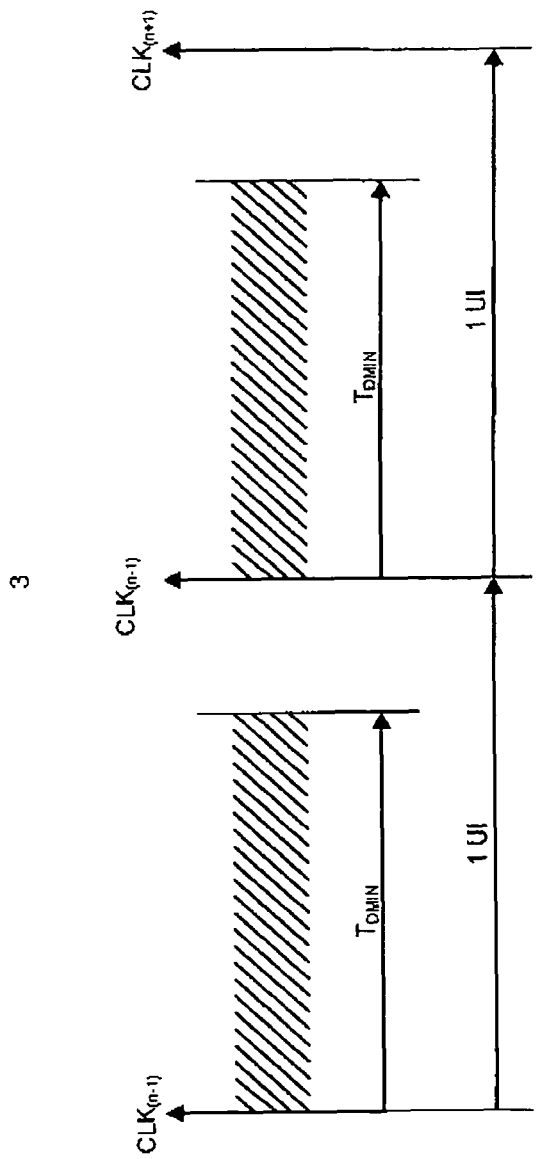
FIG. 5 shows a clock timing diagram of a synchronous system with a clock period close to the maximum allowed due to constraints in the region where the clock cannot be allowed to occur due to propagation delay through the combinatorial logic blocks.

The maximum clock frequency that may be applied to the example synchronous system in FIG. 4 is determined by the maximum propagation delay from the application of a clock signal to a first DFF, the DFF generating an output signal that passes through combinatorial logic blocks to the input of a second DFF, or possibly to the input of the first DFF. It is a typical task within synchronous logic design to minimise propagation path delays and allocate pipeline stages such that the delays are constrained within a clock period. Alternatively, the maximum clock period may be constrained by the maximum propagation path delay between any state storage elements in the synchronous logic block. In the present invention, for the purpose of explanation and clarity, the clock frequency is defined as 1.00 user interval (UI). The clock period is set larger than the maximum propagation path, determined, for example, by worst-case simulations, and defined as $T_{DMIN}$ UI. FIG. 5 shows a typical example with clock transitions $CLK_{(N-1)}$, $CLK_{(N)}$ and $CLK_{(N+1)}$ occurring at a fixed clock period of 1.00 UI and where the minimum period of a synchronous clock is bound by the propagation delay of $T_{DMIN}$ UI where $T_{DMIN}$=0.75 UI. It would be possible to apply a random modulation to the nominal clock period of 1.00 UI up to ±0.25 UI. This would result in a clock eye diagram that was very open and susceptible to side-channel attacks.

Figure 6:
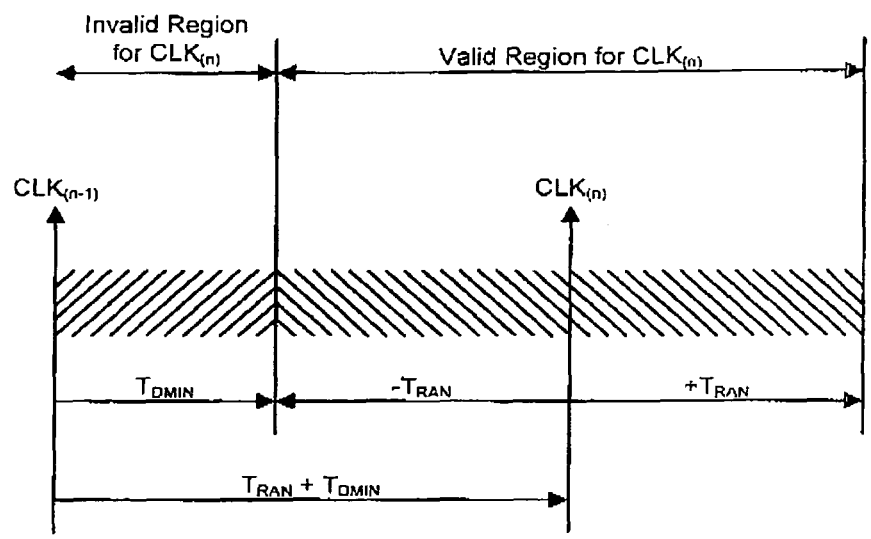
FIG. 6 shows a clock timing diagram as employed in the present invention showing the region where subsequent clock edges may be placed to achieve eye closure over a number of clock cycles.

FIG. 6 shows the timing diagram of one embodiment of the present invention where the clock is randomised in a manner that provides clock eye diagram closure. The clock is not randomly modulated within a fixed clock period but every clock edge is randomly spaced in time based on the time at which the previous clock edge occurred. A minimum time period of $T_{DMIN}$ is imposed after every clock edge where the following clock edge is not allowed to be placed. This is to ensure that signals can propagate through the combinatorial logic blocks ensuring that the setup time and hold time of the state storage elements is not violated. The amount of random modulation applied to the clock edges is defined as $±T_{RAN}$ UI. Given a clock transition $CLK_{(n-1)}$ the following clock transition $CLK_{(n)}$ is generated within a valid time region extending from $T_{DMIN}$ after the current clock edge to $T_{DMIN}+2×T_{RAN}$. The nominal clock period is $T_{DMIN}+T_{RAN}$.

Figure 7:
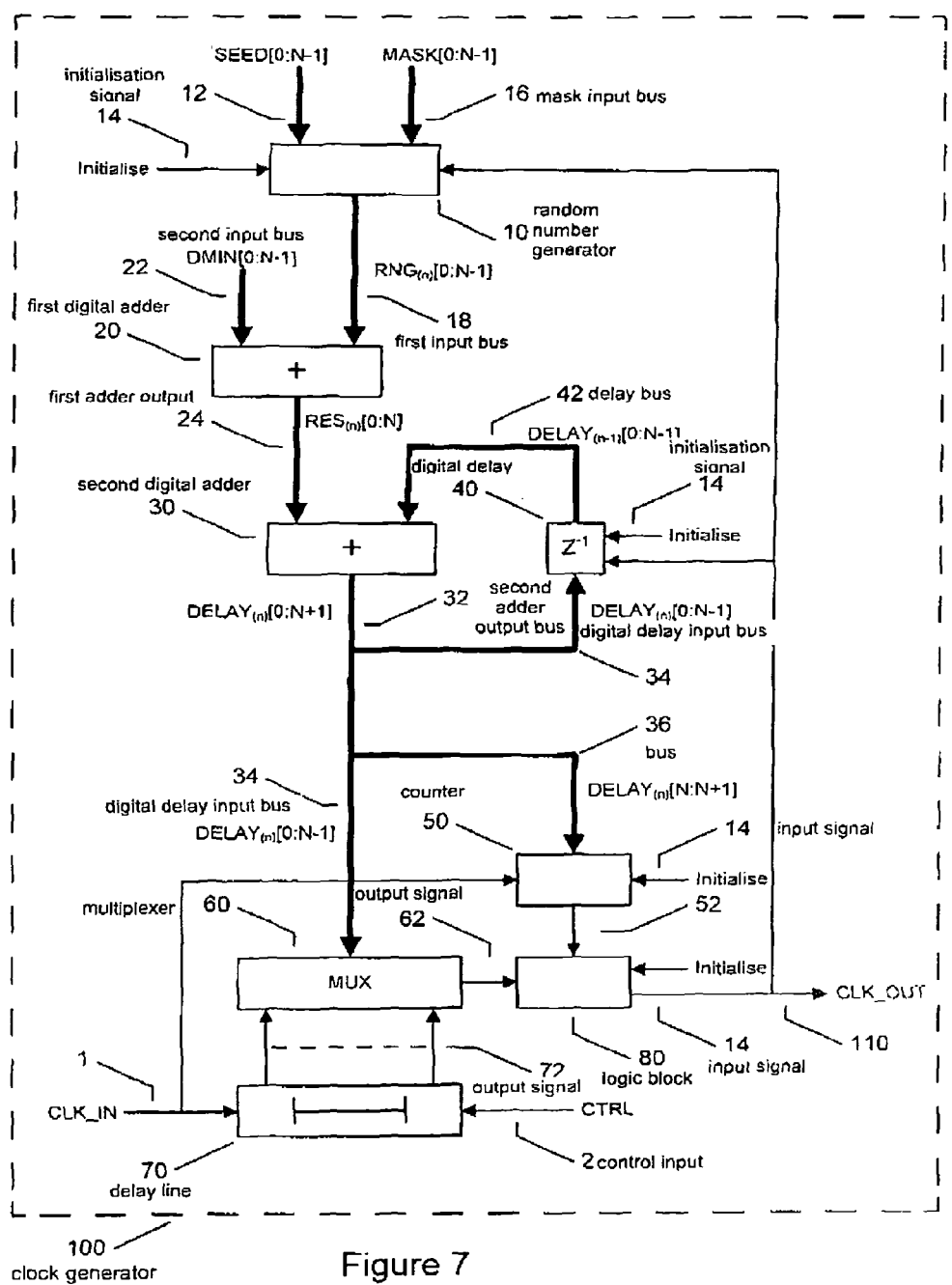
FIG. 7 shows a diagram of the random clock generator in the present invention.

FIG. 7 shows the preferred embodiment of clock generator 100 in the present invention generating timing as shown in FIG. 6 comprising: system clock input signal CLK_IN 1; random number generator 10; first digital adder 20; second digital adder 30; digital delay 40; delay line 70; delay line control signal 2; multiplexer 60; logic block 80; counter 50 and output clock 110. Other inputs to the circuit in FIG. 7 are described in the following paragraphs.

Random number generator 10 comprises: a first input signal CLK_OUT 110 to clock and advance the circuit from one random value to the next random value; a second input signal 14 to initialise the circuit to a known state relative to the system clock for applications where synchronism is required to a third-party circuit using random seed bus SEED[0:N−1] 12; a further input MASK[0:N−1] 16 that operates on the random number generated by the circuit masking one or more bits, forcing bits to zero, limiting the magnitude of the output of the circuit, the random number generator 10 thereby producing a N-bit random number $RNG_{(n)}$[0:N−1] on bus 18 where the subscript "n" denotes the $n^{th}$ output clock edge. In one embodiment random number generator is implemented as a maximal length linear feedback shift register with at least N DFF's and a number of exclusive-OR logic gates. The DFF's have a set or reset input that is controlled by initialisation signal 14, initialisation signal 14 may be synchronised to the system clock input 1, placing the DFF's into a known state. The DFF's may additionally be controlled by the random seed input bus 12, each bit of bus 12 forcing the corresponding DFF into the same logic state. The output of each DFF connects to a first input of a logic AND gate while each bit of mask input bus 16 connects to the corresponding second input of each AND gate, the outputs of the AND gates forming random number generator output bus 18. Bits in mask input bus 16 are set to logic-0 to force the corresponding bit of random number generator bus 18 to a logic-0 state and provide a means of limiting the magnitude of the random number generated.

First digital adder 20 determines the relative delay time to the next output clock edge, the delay time consisting of a variable part and a fixed part, and comprises: a first input bus $RNG_{(n)}$[0:N−1] 18 from random number generator 10 representing the random part of the delay time to the next output clock edge; a second input bus DMIN[0:N−1] 22 representing the fixed part of the delay time to the next output random edge, wherein the values of first input bus 18 and second input bus 22 are added together to form output bus $RES_{(n)}$[0:N] 24, the magnitude of which represents the relative delay time to the next output clock edge. First adder output bus 24 contains one bit more than the larger of the two input buses 18 and 22.

Second digital adder 30 determines which tap of delay line 70 is to be selected to produce the next output clock transition, that is, second adder 30 determines the time of the next output clock transition relative to the current output transition. The lower N bits of second adder 30 output bus $DELAY_{(n)}$[0:N+1] 32 have the same delay modulus as delay line 70. Second adder 30 may produce delay values in excess of N bits due to the accumulation process and the top two bits of second adder output bus 32 may be considered as representing the number of system clock periods that must elapse before the pulse selected by the lower N bits is allowed to be used to reconstitute the output clock 110. Second adder 30 combines with digital delay 40 to constitute an accumulator where the lower N bits are accumulated every output clock. Second adder 30 has a first input bus $RES_{(n)}$[0:N] 24, connected to the output of first adder 20, a second input bus $DELAY_{(n+1)}$[0:N−1] 42 connected to the output of digital delay 40 and an output bus $DELAY_{(n)}$[0:N+1] 32. Digital delay 40 comprises N DFF's connected to form a register with a first input bus $DELAY_{(n)}$[0:N−1] 34, a clock input signal connected to the random clock generator output clock 110, an initialisation input signal 14 and an output bus $DELAY_{(n-1)}$[0:N−1] 42. The lower N bits of second adder output bus $DELAY_{(n)}$[0:N+1] 32 form digital delay input bus $DELAY_{(n)}$[0:N−1] 34 each bit connecting to a DFF input, the output of each DFF creating digital delay output bus $DELAY_{(n-1)}[0:N-1]$ 42, each DFF's being, for example, reset by initialisation signal 14 and input clock 110 connecting to the clock input of each DFF effecting a transfer from input bus $DELAY_{(n)}[0:N-1]$ 34 to output bus $DELAY_{(n-1)}[0:N-1]$ 42 on a clock edge transition.

Figure 8:
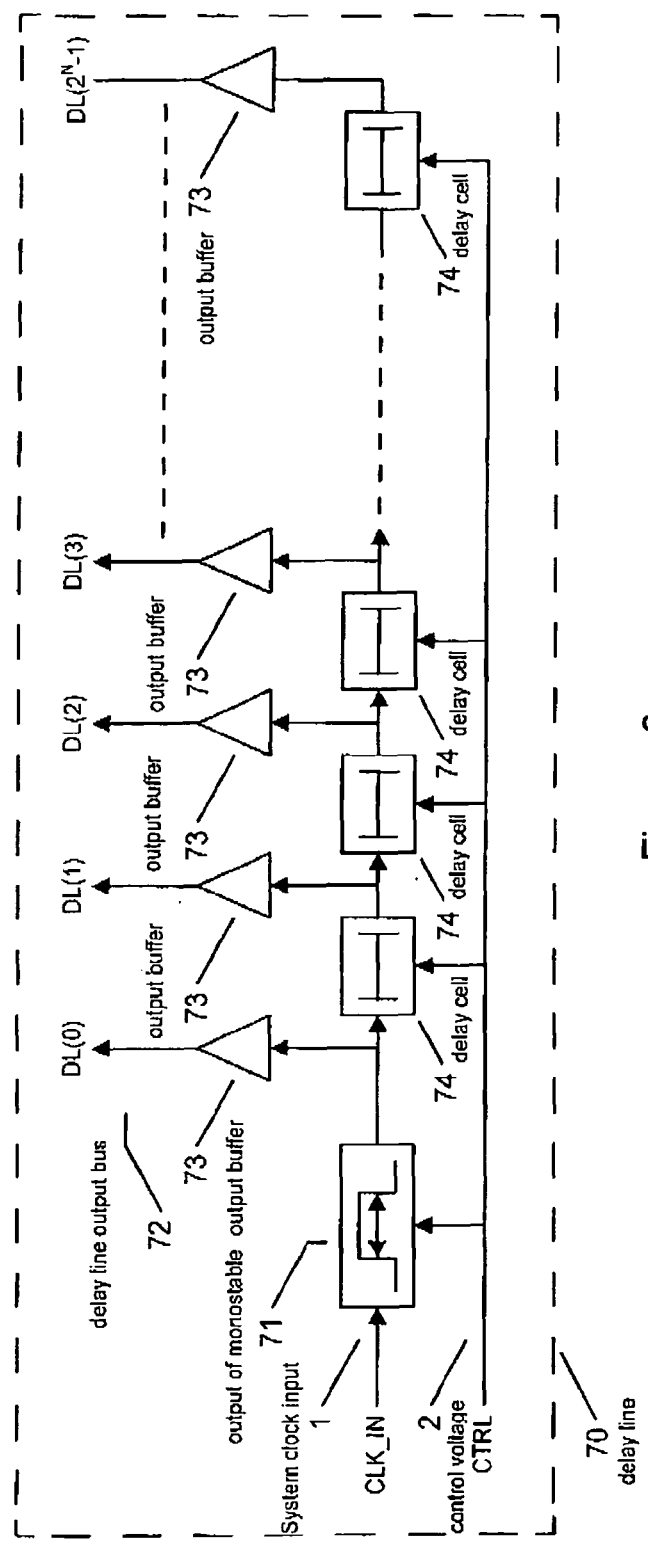
FIG. 8 shows a diagram of the delay line in to the present invention.

Delay line 70 in a preferred embodiment shown in FIG. 8 comprises monostable 71, a plurality of preferably identical delay cells 74, preferably $2^N-1$ delay cells and a plurality of output buffers 73, one output buffer for each delay line tap. Clock input CLK_IN 1 connects to the monostable input where the monostable produces an output pulse of pre-determined width from, for example, each rising edge of the system clock 1, the monostable output pulse width preferably less than the maximum propagation delay DMIN in the synchronous logic. In one embodiment the monostable pulse width is controlled by control input CTRL 2, where control input CTRL 2 maintains the monostable pulse width constant over one or more parameters of process, voltage or temperature. The output of monostable 71 connects to the input of a first delay cell 74, the output of the first delay cell 74 connecting to the input of second delay cell 74, the output of the second delay cell 74 connecting to the input of a third delay cell 74 and so forth till all delay cells are connected in a serial manner ensuring delay monotonicity. The output of monostable 71 and the outputs of delay cells 74 are each connected to individual output buffers 73, the outputs of the output buffers 73 forming the delay line output bus 72. In one embodiment the delay of all delay cells is controlled by control input CTRL 2, where control input CTRL 2 maintains the monostable pulse width constant over one or more parameters of process, voltage or temperature. Delay line 70 thereby produces a plurality of output pulses 72 from, for example, the rising edge of system clock input CLK_IN 1, output pulses being separated in time by, preferably, nominally equal time periods the number of output pulses preferably equal to $2^N$.

System clock input CLK_IN 1 is preferably generated by a stable oscillator and preferably also linked to control voltage CTR 2 for reasons of accuracy maintaining the delay per stage of delay line 70 and the accumulative delay from the system clock input CLK_IN 1 to the final output of delay line 70 constant.

Multiplexer 60 comprises a first input bus $DELAY_{(n)}[0:N-1]$ 34 and a second input bus 72, the first input bus $DELAY_{(n)}[0:N-1]$ 34 controlling selection of one signal from second input bus 72, in effect selecting one from $2^N$ bits of second input bus 72, the second input bus 72 comprising pulses delayed in time with respect to the system input clock CLK_IN 1 and producing output signal 62. Means to implement multiplexer 60 are well known to someone practiced in the art and would include, for example but without limitation, a logic decoder of N-lines to $2^N$-lines and tree of transmission gates. Other means to produce a delay line and means of selecting a delayed signal from the delay line are well known to those practiced in the art and should be considered within the spirit of the invention.

Figure 9:
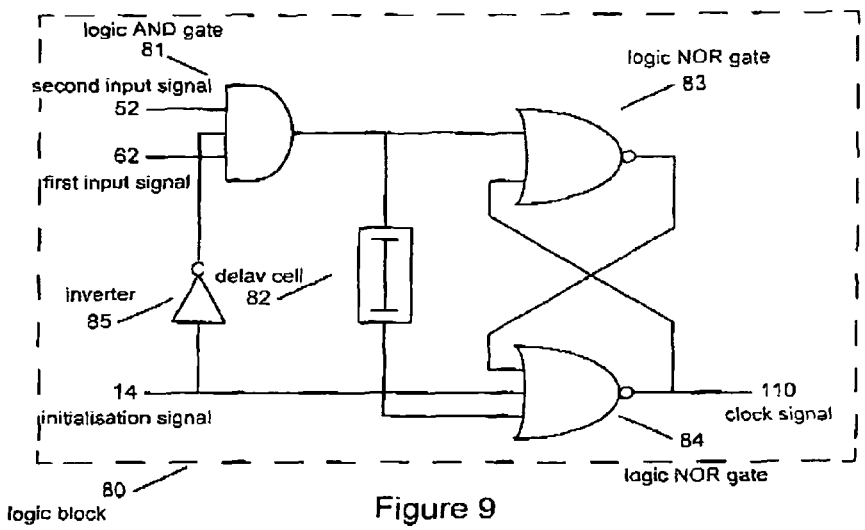
FIG. 9 shows a diagram of the output gating and clock reconstructing circuit in the present invention.

FIG. 9 shows one embodiment of logic block 80 comprising logic AND gate 81, delay cell 82, a latch formed by logic NOR gates 83 and 84 and inverter 85 providing the local inversion of initialisation signal 14. Logic block 80 performs a gating function with logic AND gate 81 disabling the passage of pulses from multiplexer 60 on a first input signal 62 when either second input signal 52 is logic-0 or the output of logic inverter gate 85 is logic-0, corresponding to the initialisation signal 14 being logic-1. When conditions are such that logic AND gate 81 passes a pulse from first input signal 62 the set-reset latch formed by delay cell 82 and logic NOR gates 83 and 84 produces a pulse on the output CLK_OUT 110 of width determined predominantly by delay cell 82. The output is initialised by initialisation signal 14 that when placed in the logic-1 state sets CLK_OUT 110 to a logic-0 state.

The function of counter 50 is to generate an output signal that enables or disables the passage of pulses from multiplexer 60 output signal 62 when an overflow condition has occurred in second adder output bus 32 signified by the non-zero value of the bits in bus $DELAY_{(n)}[N:N+1]$ 36. When the bits in bus $DELAY_{(n)}[N:N+1]$ 36 are both zero then the output signal 52 is logic-1 when either bit in bus $DELAY_{(n)}[N:N+1]$ 36 is logic-1 then the output signal 52 is logic-0. The value represented by the bits in bus $DELAY_{(n)}[N:N+1]$ 36 is meant to represent the number of system clock CLK_IN 1 periods that must elapse before the next pulse from multiplexer 60 is allowed to pass though logic block 80 and form output clock CLK_OUT 110. In a simplistic embodiment counter 50 comprises a state machine that takes as a first input bus $DELAY_{(n)}[N:N+1]$ 36 and executes actions at transitions of the system clock CLK_IN 1. If the bits in bus $DELAY_{(n)}[N:N+1]$ 36 are both logic-0 then the output enable signal 52 is set to logic-1 otherwise the output enable signal 52 is set to logic-0 and the state machine counts down the value presented on the bits in bus $DELAY_{(n)}[N:N+1]$ 36 on the rising edge transitions of system clock CLK_IN 1 delaying the generation of the output enable signal 52 until such time as the value counted down in the state machine reaches zero. Initialisation signal 14 is input to counter 50 to initialise the counter to a known state on power-up or start-up of clock generator 100.

Figure 10:
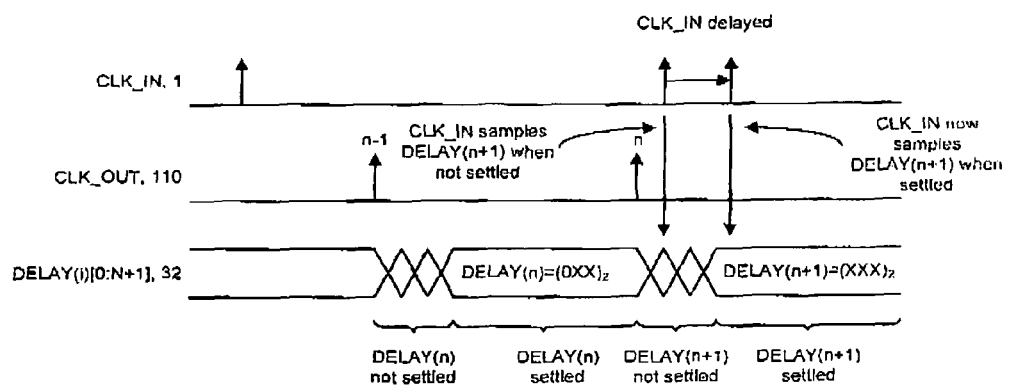
FIG. 10 shows a timing diagram associated with an input and output clock synchronisation issue.

One issue arises in the implementation of counter 50 in the use of system clock CLK_IN 1 to sample bus $DELAY_{(n)}[N:N+1]$ 36 it is possible to sample when the data bits in the bus $DELAY_{(n)}[N:N+1]$ 36 are not settled. A technique to overcome this issue is now disclosed. First, it is necessary to understand when this issue may arise. Consider the case shown in FIG. 10 where a CLK_OUT transition has been generated in response to second adder output bus $DELAY_{(n-1)}[0:N+1]$ 32. CLK_OUT advances the random number generator 10 and the digital delay 40 causing signals to propagate through first adder 20 and second adder 30 forming the new delay value on second adder bus $DELAY_{(n)}[0:N+1]$ 32. It can be seen that the next clock transition is going to occur just before CLK_IN 1. It is then at the generation of the CLK_OUT(n) transition that the CLK_IN 1 sampling edge would attempt to sample second adder output bus $DELAY_{(n+1)}[N:N+1]$ 36 while the data bits were not valid. A technique and method to overcome this issue is proposed whereby the clock sampling overflow data bits $DELAY_{(n)}[N:N+1]$ 36 at the state machine input is formed from a delayed clock that ensures that sampling only occurs when the overflow data bits $DELAY_{(n)}[N:N+1]$ 36 are settled.

The solution to this problem exists when the propagation path through first adder 20 and second adder 30 is less than the minimum propagation delay $T_{DMIN}$ in the synchronous logic block 200. It is an implicit condition for operation of clock generator 100 that the propagation path through first adder 20 and second adder 30 is shorter than $T_{DMIN}$. First it is necessary to determine when this condition will occur and when imminent generate a sampling signal active only when the overflow data bits are settled. Detecting the settling error condition is possible by evaluating the value of bus $DELAY_{(n)}[0:N+1]$ 32. When the value on bus $DELAY_{(n)}[0:N+1]$ 32 is within the settling time, $T_{SETTLE}$, of the next CLK_IN 1 sampling edge which is the same as being within $T_{SETTLE}$ of a change in the top two most significant bits of then it is necessary to delay CLK_IN 1 by an amount less than DMIN yet more than the settling time of bus DELAY$_{(n)}$[0:N+1] 32. In a preferred embodiment the sampling signal so generated is a delayed version of random clock generator 100 output clock CLK_OUT 110.

Figure 11A:
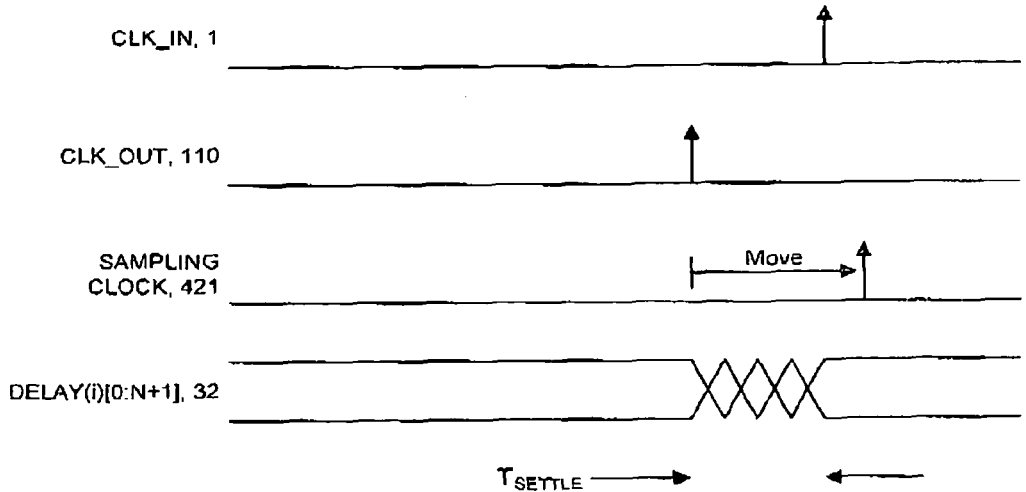
FIG. 11a shows a first timing diagram of the clock delay required for the sampling clock synchronisation.

FIG. 11a shows the first extreme case where output clock transition CLK_OUT(n) 110 occurs just before the CLK_IN 1 sampling transition. In this extreme case only the very minimum delay of CLK_IN 1 is necessary. Alternatively a sampling signal may be generated by CLK_OUT 110 by delaying CLK_OUT 110 by an amount larger than T$_{SETTLE}$ but less than T$_{DMIN}$.

Figure 11B:
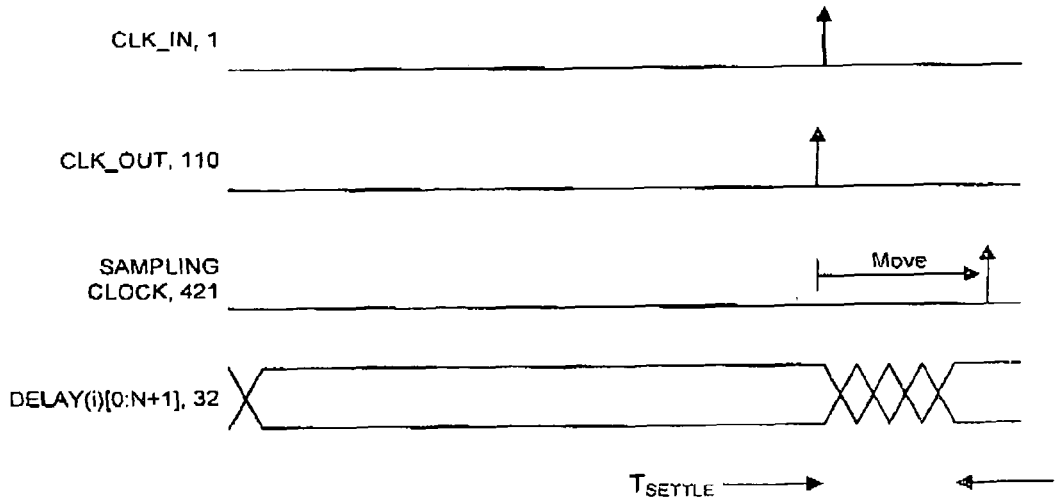
FIG. 11b shows a second timing diagram of the clock delay required for the sampling clock synchronisation.

FIG. 11b shows the last extreme case where output clock transition CLK_OUT(n) 110 occurs almost at the same instant as the CLK_IN 1 sampling transition. In this extreme case CLK_IN 1 needs to be delayed by at least T$_{SETTLE}$. Alternatively a sampling signal may be generated by CLK_OUT 110 by delaying CLK_OUT 110 by an amount larger than T$_{SETTLE}$ but less than T$_{DMIN}$.

Figure 12:
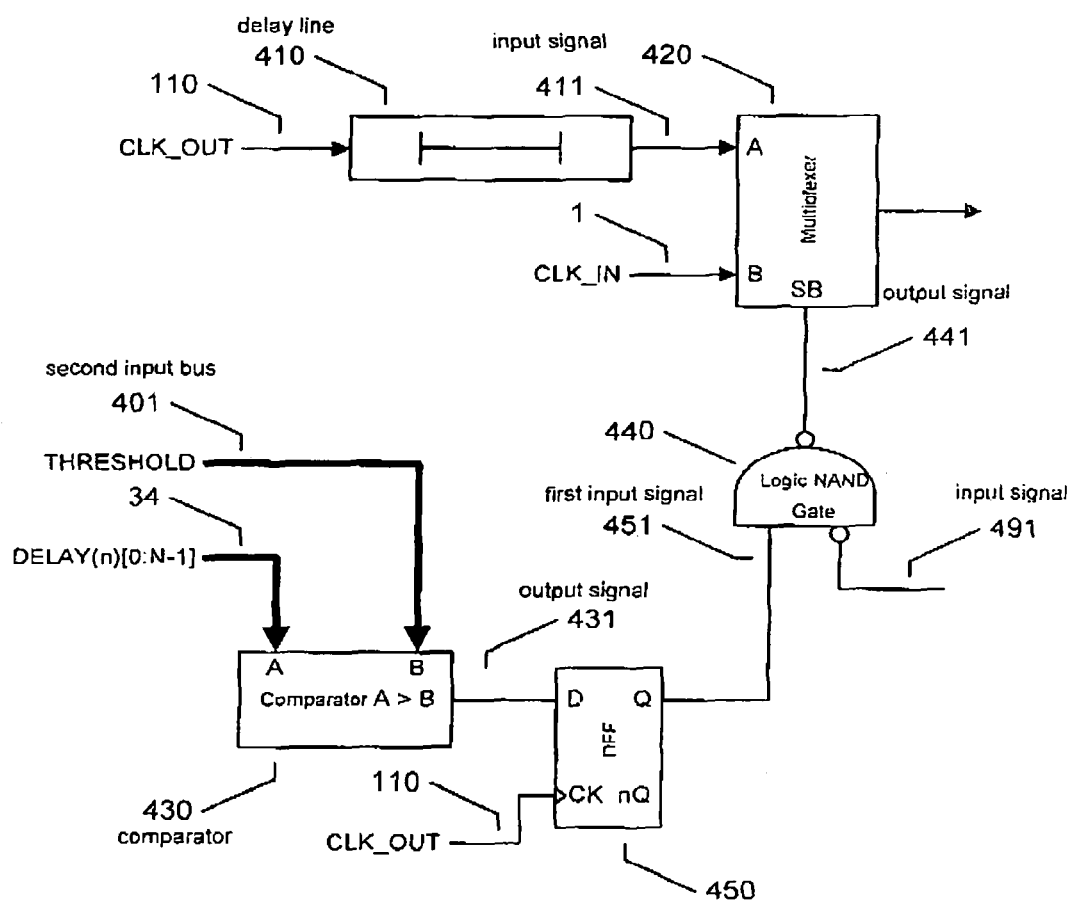
FIG. 12 shows a diagram of the sampling clock delay and selection means in the present invention.

The preferred embodiment of the clock selector for the state machine in counter 50 is shown in FIG. 12 and comprises: a first clock input CLK_IN 1; a second clock input CLK_OUT 110; delay line 410 producing output signal 411 a delayed version of second clock input 110, delayed by an amount greater than T$_{SETTLE}$ but less than DMIN, preferably stabilised against time variations in the manner used by other delay lines in the invention; comparator 430 with a first input DELAY$_{(n)}$[0:N−1] 34, a second input bus THRESHOLD 401 producing a logic-1 output 431 when the value from bus DELAY(n)[0:N−1] 34 exceeds the value of bus THRESHOLD 401 otherwise producing a logic-0; DFF 450 latching the result of comparator 430 output signal 431 on CLK_OUT 110 transitions and producing output signal 451; logic NAND gate 440 with a first input signal 451, a second, negated, input signal 491 from counter 50 state machine producing output signal 441 as the logical NAND of the first and negated second input signals and multiplexer 420, said multiplexer selecting a first input, signal 411, or a second input, CLK_IN 1, depending on the state of third input 441, first input signal 411 selected when the latched comparison result signal 451 is a logic-1 and signal 491 is logic-0 otherwise second input signal CLK_IN 1 selected.

It is noted that alternative methods are possible within the spirit of the invention including delaying CLK_IN 1 by an amount equal to the difference between the transition of the lower and upper bits in bus DELAY$_{(n)}$[0:N+1] plus a delay greater than T$_{SETTLE}$ but less than DMIN. Other implementations of the hardware to delay CLK_IN 1 will be obvious to someone practiced in the art.

By means of an example the operation of the random clock generator 100 is now explained. The parameter N may be set to, for example the number 8, that is, delay line 70 would have 256 delay taps the maximum duration of delay line 70 set to 1.00 UI and the difference between adjacent taps of delay line 70 nominally ¹⁄₂₅₆$^{th}$ UI. Multiplexer 60 would comprise a 1-from-256 data selector with the lower 8 bits of second adder 30 forming the input bus DELAY$_{(n)}$[0:7] 34 to multiplexer selecting the tap from delay line 70 to produce the required delay. The top two bits of second adder 30, bus DELAY$_{(n)}$[8:9] 36, represent the number of system clock delay periods. If necessary then the state machine in counter 50 counts down from the value of bus DELAY$_{(n)}$[8:9] 36 and when it reaches zero then the output enable signal 52 is set to a logic-1 allowing logic block 80 to produce the output clock transitions when the pulse from the delay line, selected by multiplexer 60 occurs at the input to logic block 80 on signal 62.

It should be obvious to someone practiced in the art that the order of the addition of random number generator bus 18, DMIN bus 14 and the previous delay bus 42 are not the only method by which the next delay line tap can be calculated: other implementations are possible that will return the same result. For example, the order of the addition of the three numbers may be changed.

It can be understood that the input clock signal CLK_IN, 1, passes through delay line 70 and other logic gates and, unlike a ring oscillator implementation, will only be subject to additive random jitter and deterministic jitter from the delay line which is not accumulative.

In another embodiment of the present invention the DMIN value may be randomised, modified on a cycle by cycle basis. A lower bound is set on the DIMN value equal to the maximum propagation delay between stages. One implementation of this method is to add a second random number generator for the DMIN value with a mask that limits the minimum value of input bus 22 to first adder 20. It is noted that this does result in an increase in the nominal output clock period.

Figure 13:
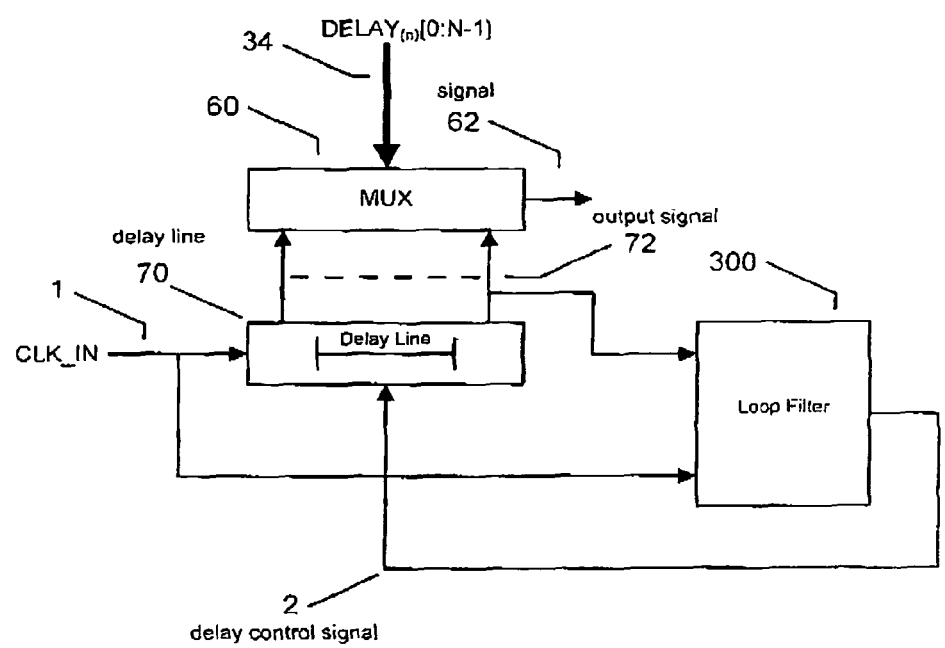
FIG. 13 shows a diagram of the delay line and associated circuits in a second embodiment of the present invention.

In another embodiment of the present invention, to improve the accuracy of the timing of clock edge transitions, delay line 70 is part of a delay locked loop. FIG. 13 shows a modification to delay line 70 comprising phase detector and loop filter 300 taking as first input CLK_IN 1 and second input delay line output signal 72, the signal with the maximum delay from the delay line, which, in the preferred embodiment is meant to be nominally one system clock period or 1.00 UI, detecting the phase error between the two input signals, detecting possible lock-up conditions and producing a voltage or current to control the delay of delay cells in delay line 70 with delay control signal 2. The art of delay locked loops is well known to those practiced in the art and it is recognised that other implementations are possible within the spirit of the invention.

In one embodiment of the present invention the D$_{MIN}$ parameter is set to 0.75 UI reflecting the fact that 1.00 UI would be a suitable minimum clock period for a conventional system clock. The T$_{RAN}$ parameter set to 0.50 UI resulting in a nominal randomised clock period of 1.25 UI, an increase of 25% in the clock period but gaining complete clock eye diagram closure. The parameter N is set to 8 giving an 8-bit maximal length linear feedback shift register producing output values (00)$_2$ to (FE)$_2$ with value (FF)$_2$ an illegal state. Digital adder 20 is 8-bit+8-bit adder while digital adder 30 is a 9-bit+8-bit adder. Digital delay 40 is an 8-bit register of DFF's. Counter 50 implements a 4 state machine sampling the overflow data bits DELAY$_{(n)}$[8:9] 36 at a point where they are always settled and producing the output enable signal 52 when the appropriate number of system clock periods have elapsed. Delay line 70 may comprise as many as 255 delay elements as the bus DELAY$_{(n)}$[0:N−1] can address that many signals. Values for parameters DMIN[0:N−1] 22 and THRESHOLD 401 are system specific. The present invention is not limited to operation with the above parameter values and other parameter values are possible without limitation of the present invention.

It has herein been shown that in a preferred embodiment of the present invention the use of a random clock generator can provide a closed eye diagram with minimal reduction in operating frequency is beneficial to randomising the position of current peaks and rendering a synchronous logic system more resistant to monitoring of the current or electromagnetic emissions as a means to determine the internal secrets of said synchronous logic system without the significant decrease in clock frequency that would occur in a prior art synchronous logic system. It has further been shown in the preferred embodiment of the present invention a random clock generator does not have clock jitter accumulation which is prevalent in other means of generating a random clock signal.

We claim:

1. A synchronous logic device for preventing a third party from determining aspects of the internal operation or data or other aspects through monitoring of the current or electromagnetic emissions generated by state changes that occur at clock edge transitions, comprising a synchronous logic system without a clock generator and
   a clock generator for clocking the synchronous logic system such that the output data has a closed eye diagram over a plurality of clock cycles,
   wherein said clock generator for producing an output clock with a closed eye diagram over a plurality of clock cycles is bounded by programmable limits and comprises;
      an input clock signal;
      a random number generator for producing a data word at each output clock transition;
      a first logic module for calculating the time delay from the current output clock transition to the next output clock transition;
      a second logic module for converting the time delay value for the next output clock transition from the first logic module into a value that is relative to the input clock, with ability to extend the time delay value over more than one period of the input clock;
      a delay circuit for producing an output pulse delayed in time to the input clock, wherein the time delay is variable through a control bus;
      a third logic module for producing an output gating signal in the presence of overflow bits from the output of the second logic module;
      an output gating and clock reconstruction circuit.

2. A synchronous logic device according to claim 1 wherein said random number generator comprises:
   a first input data word and a first control signal to initialize the random number generator with a known starting value;
   a first input mask setting one or more random number generator output bits to zero for limiting the magnitude of the value produced by said random number generator;
   a third input intended to halt operation of the random number generator when said random number generator needs to be started relative to an external clock or other signal;
   a third input, used to feed the random clock generator output clock signal, in order to cause the random number generator to advance from the current state to the next state;
   an output data word of N bits, N being an integer greater than 1, representing a delay time of magnitude directly related to the delay circuit maximum delay duration.

3. A device according to claim 1, wherein the first logic module comprises a first digital adder with a first input data word, data supplied by said random number generator, a second input data word supplied from a first register, said first register value defining the minimum separation between output clock transitions and a value larger than that defining the maximum propagation period between said state storage elements in the synchronous logic system, wherein said first digital adder is implemented so that its output data word is equal to the logical sum of the two input data words and the output data word contains one more data bit than the largest number of data bits in either of the two input data words thus avoiding overflow.

4. A device according to claim 1, wherein the second logic module comprises a second digital adder with a first input data word supplied from the output of the first digital adder, a second input data word supplied from a second register and generating an output data word containing one more data bit than the largest number of data bits in either of the two input data words, the output data word equal to the sum of the two input data words, said second logic module producing an output delay data bus that corresponds to a delay time relative to the input clock, where the upper two bits of the delay data bus, are overflow data bits, corresponding to a delay time of multiples of the input clock period and the remainder of the delay data bus bits, the delay line data bus, corresponding to a delay of up to one clock period.

5. A system according to claim 4, wherein the second register comprises: an input data word of the number of bits in the delay line data bus word; an output data word of the same number of data bits as the input data word; a number of state storage elements, one state storage element for each input/output data bit pair, each state storage element with a common clock signal and a common initialization signal, the output data word formed from the input data word on the transition of the common clock signal, the random clock generator output clock signal; the output data word set to an initial value by the common initialization signal.

6. A device according to claim 1, wherein the delay circuit comprises:
   a monostable producing an output pulse from a transition of the input clock, the starting edge of the monostable output pulse with minimal delay relative to the input clock transition that generated the staring edge of the monostable output pulse, the width of the monostable output pulse determined from delay elements within the monostable, the width of the monostable pulse width less then the minimum time between output clock transitions, and an input control signal for controlling the monostable pulse width against process, voltage and temperature variations;
   a delay line comprising a plurality of delay cells, each delay cell with a first input signal, a second input signal and an output signal, the output signal a delayed version of the first input signal, the second input signal connecting to all delay cells controlling the delay duration of each and every delay cell, the first input to the first delay cell connected to the output of the monostable, the output of the first delay cell connected to the first input of the second delay cell, all delay cells connected in series with the output of each delay cell connecting to the first input of the following delay cell, the outputs of the monostable and all delay cells forming a bus of a given number of output signals equal to the maximum value delay line data bus, each output signal unique in providing a pulse delayed in time relative to the random clock generator input clock, the time delay from the input transition of the random clock generator input clock to the pulse from the last delay cell equal to the clock period of the random generator input clock;
   a multiplexer that selects one of the delay line output signals matching the delay tap to the value in the delay line data bus producing an output pulse indicating where the next random clock generator output clock transitions may occur dependent on the overflow flow data bits and output gating circuit.

7. A device according to claim 1, wherein the delay circuit comprises:
   a monostable producing an output pulse from a transition of the input clock, the starting edge of the monostable output pulse with minimal delay relative to the input clock transition that generated the staring edge of the monostable output pulse, the width of the monostable output pulse determined from delay elements within the monostable, the width of the monostable pulse width less then the minimum time between output clock transitions, and an input control signal for controlling the monostable pulse width against process, voltage and temperature variations;

a delay line comprising a plurality of delay cells, each delay cell with a first input signal, a second input signal and an output signal, the output signal a delayed version of the first input signal; the second input signal connecting to all delay cells controlling the delay duration of each and every delay cell, the first input to the first delay cell connected to the output of the monostable, the output of the first delay cell connected to the first input of the second delay cell, all delay cells connected in series with the output of each delay cell connecting to the first input of the following delay cell, the outputs of the monostable and all delay cells forming a bus of signals equal in number to the maximum value in the delay line data bus, each output signal unique in providing a pulse delayed in time relative to the random clock generator input clock, the time delay from the input transition of the random clock generator input clock to the pulse from the last delay cell equal to the clock period of the random generator input clock;

a multiplexer that selects one of the delay line output signals based on the value of the delay line data bus producing an output pulse used to generate the random clock generator output clock transitions;

a phase detector comprising a first input, the random clock generator input clock, a second input, the delay line final delay cell output signal, the phase detector producing an output that is related to a difference in phase between the first input and second input, a filter smoothing the phase detector output signal and adjusting the delay of the monostable and delay line achieving an overall delay in the monostable and delay line equal to the clock period of the random clock generator over process, voltage and temperature variations.

8. A device according to claim 1, wherein the third logic module comprises:

a sampling clock selection circuit that samples the overflow data bus bits in a manner that ensures the overflow data bus bits are sampled at a point in time when they are stable and not changing with a first input clock, the random clock generator input clock, a second input clock, the random clock generator output clock and producing as output a sampling clock;

a sampling circuit comprising two D-type flip-flops each with a first input connected to one of the overflow data bus bits, a second input connected jointly connected to an initialization signal allowing initialization of the circuit at power up or, when synchronization is desired to an external event, each D-type flip-flop having an output signal storing the state of the overflow bits when sampled by the sampling clock;

a state machine with input signals the output of the sampling circuit a plurality of state storage elements and combinatorial logic the state machine clocked by the sampling clock, with inputs to the state machine the sampled overflow bits, implementing a counting sequence to determine the number of clock cycles that must be skipped before enabling the output enable gate and producing an output enable signal.

9. A device according to claim 1, wherein the said sampling clock selection circuit comprises:

a first clock input, the random clock generator input clock;

a second clock input, the random clock generator output clock;

a delay line with input connected to the random clock generator output clock with a delay time magnitude corresponding to a value that is no less that the worst-case propagation path delay through the first and second logic modules from an output clock transition to the overflow data bits being settled and that is no more than the minimum delay between transitions of the random clock generator output clock, the delay line with a control input used to stabilize the delay duration against process, voltage and temperature variations;

a comparator with a first input, the delay line data bus and a second input bus from a register representing a threshold, the comparator output set to the logic-1 state when the value of the delay line data bus delay exceeds the value of the threshold bus;

a DFF to latch the value of the comparator output using the random clock generator output clock; —a NAND gate taking a first input from the DFF output and a second input, subsequently complemented, from the state machine and the output of said NAND gate connected to the select input of the multiplexer.

10. A device according to claim 1, wherein the output-gating and clock reconstruction circuit comprises:

a logic gate with a first input connected to the output of the delay line, a second input connected to the output enable signal of the third logic module, a third input the complement of the initialization signal, the logical AND function of the three input signals producing an output signal;

a delay line with input connected to the output of the logic gate with the AND function, producing a delayed signal of duration predominantly equal to the duration of the random clock generator output clock pulse width;

a set-reset latch with a first input connected to the output of the logic gate with the AND function, second input connected to the output of the delay line and third input connected to the initialization signal, the set-reset latch placed into one state when a signal on the first input occurs and placed into the second complementary state when the second signal, the delayed version of the first signal, occurs and the set-reset latch placed into an initialized state when the third input, the initialization signal occurs, the initialization signal over-riding the other signals, the output of the set-reset latch being the output clock of the random clock generator.

11. A method for performing synchronous logic operations with enhanced security pertaining to a third party attempts in determining aspects of the internal operation or other aspects through monitoring of the current or electromagnetic emissions generated by state changes that occur at clock edge transitions comprising a clock generator with a closed eye diagram; wherein said clock generator for producing an output clock with a dosed eye diagram over a plurality of clock cycles is bounded by programmable limits and comprises:

an input clock signal;

a random number generator for producing a data word at each output clock transition;

a first logic module for calculating the time delay from the current output clock transition to the next output clock transition;

a second logic module for converting the time delay value for the next output clock transition from the first logic module into a value that is relative to the input clock, with ability to extend the time delay value over more than one period of the input clock;

a delay circuit for producing an output pulse delayed in time to the input clock, wherein the time delay is variable through a control bus;

a third logic module for producing an output gating signal in the presence of overflow bits from the output of the second logic module;

an output gating and clock reconstruction circuit.

12. A method for generating a dock signal with a dosed eye diagram with a minimal reduction in operating frequency in a synchronous logic device, for preventing a third party from determining aspects of the internal operation or data or other aspects through monitoring of the current or electromagnetic emissions generated by state changes that occur at clock edge transitions, wherein the said logic device comprises a synchronous logic system without a clock generator and wherein the clock signal is generated by a clock generator, wherein the said clock generator for producing an output clock with a closed eye diagram over a plurality of clock cycles is bounded by programmable limits and comprises:

an input clock signal;

a random number generator for producing a data word at each output clock transition;

a first logic module for calculating the time delay from the current output clock transition to the next output clock transition;

a second logic module for converting the time delay value for the next output clock transition from the first logic module into a value that is relative to the input clock, with ability to extend the time delay value over more than one period of the input clock;

a delay circuit for producing an output pulse delayed in time to the input clock, wherein the time delay is variable through a control bus;

a third logic module for producing an output gating signal in the presence of overflow bits from the output of the second logic module;

an output-gating and clock reconstruction circuit.

* * * * *